June 4, 1946.  J. K. PICKENS  2,401,661

SCOOP OR GRADING ATTACHMENT FOR FARM TRACTORS

Filed March 31, 1945

Inventor

Julius K. Pickens

By Henry C. Parker

Attorney

Patented June 4, 1946

2,401,661

UNITED STATES PATENT OFFICE 2,401,661

SCOOP OR GRADING ATTACHMENT FOR FARM TRACTORS

Julius K. Pickens, Maryville, Tenn.

Application March 31, 1945, Serial No. 585,922

10 Claims. (Cl. 37—128)

This invention has reference generally to farm machinery and more particularly relates to a scoop or grading attachment for farm tractors.

The present invention has for its primary aim and object the provision of a device of the above character designed to be readily attached to and removed from the front end of row crop tractors, that is, tractors having the front wheels or crawlers close together. Commercialy available types are known in the trade as John Deere, Case, Farmall, Oliver, Allis Chalmers and others. The scoop is straddled about and positioned forwardly of the hood of the tractor and can be arranged in either a self-loading scraping position, a leveled carrying position or a dumping position, so as to aid the farmer in clearing waste from and around the barn, leveling roads and fields, excavating, draining lowlands and performing other truck jobs on the farm.

As an equally important object the invention embraces the provision of a tractor attachment which is especially adapted for excavating, being self loading and capable of hauling from two to four yards of dirt, rock, sand etc. and of spreading the load at the desired place in the manner of a dump truck.

More particularly the invention may be said to consist of a body having a scooping front end and a bifurcated rear end providing dumping channels, the body being pivotally mounted in bearings provided at the forward part of the tractor frame in such manner that the scoop has a normal tendency to tilt forwardly and assume a ground engaging position in advance of the tractor, means being provided for raising the forward end into a leveled carrying or hauling position and/or into an elevated dumping position.

More specific objects of the invention consist in the provision of guiding and connecting means combined with the lifting means for operably connecting the latter with the power lift of the tractor and the provision of journals and supporting brackets and shafts for attachment of the scoop to the frame of the tractor, to facilitate its quick application and removal, as well as the provision of pivoted end gates on the dumping channeled ends of the body.

Other objects, as well as the nature and characteristic features and scope of the invention will be more readily apparent from the following description taken in connection with the accompanying drawing and pointed out in the claims forming a part of this specification.

Figure 1:
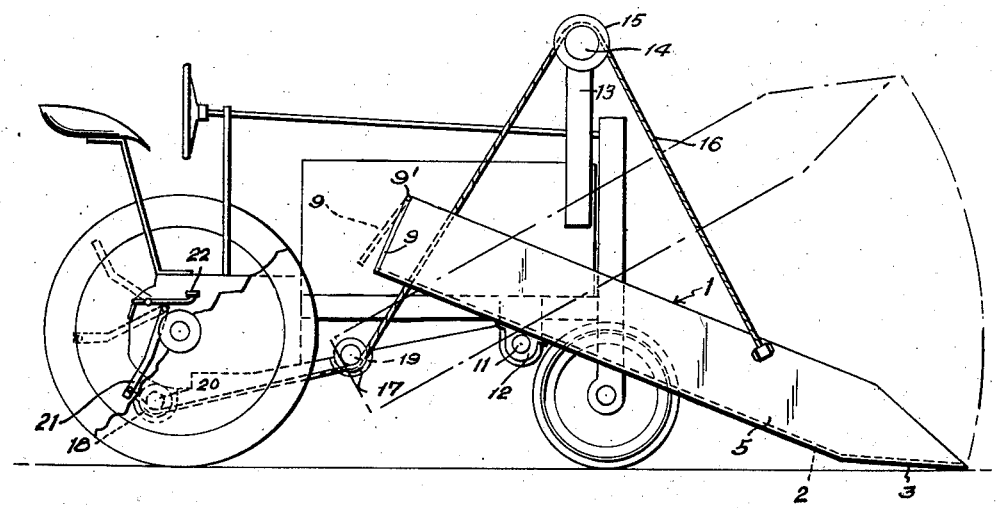
Figure 2:
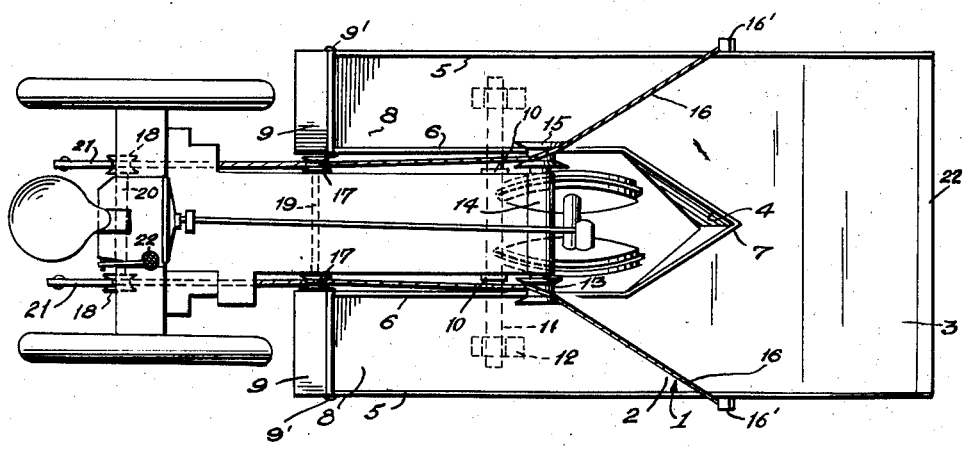

The invention is clearly illustrated in the accompanying drawing, in which,

Fig. 1 is a side elevational view of the improved scoop, applied to a tractor of the John Deere type, and shown in the scooping position, the dotted lines showing the positions assumed when hauling or carrying and dumping, parts being broken away to show details and Fig. 2 is a top plan view of the arrangement shown in Fig. 1.

Similar characters of reference are employed in all of the above described views to indicate corresponding parts.

Referring now more particularly to the accompanying drawing, there is illustrated a tractor of the John Deere type and removably arranged on the front end thereof is the improved scooping and grading attachment. The attachment comprises a substantially rectangular body 1 having a substantially flat bottom 2, the forward scraping end of which is slightly inclined as at 3 while the medial and rear portion is bifurcated as at 4 (Fig. 2) so as to be straddled about the forward end of the tractor. The body at the sides and along the bifurcation is provided with outer walls 5 and inner walls 6, the latter at the inner part of the bifurcation being joined to form a divider 7 so that material scooped from the ground may be guided into the channels 8 provided along the sides and to the rear of the scoop, as clearly shown in Fig. 2 of the drawing. End gates 9 are pivotally connected at 9' to the walls at the rear ends of the channels so that material may be discharged therefrom.

In order that the scoop body may be removably and pivotally connected to the frame of the tractor, bearings 10 (Fig. 2) are fixed to the side of the frame near its front end for receiving a transverse supporting shaft 11 the ends of which project beyond the sides of the tractor frame and are also journaled in brackets 12 secured to the bottom of the scoop body toward its rear end so that owing to the greater weight of the forward end it will normally assume a tilting or inclined position as shown in full lines in Fig. 1. In this connection it is to be noted that the depth of the bifurcation 4 is such that the scoop clears the hood of the tractor when it is desired to swing the body into an elevated dumping position as shown in dotted lines in Fig. 1. Obviously also the scraper body may be swung into a horizontal or level position when desired for hauling purposes.

Suitable means are provided for raising and lowering the scraper relative to the tractor and, in reducing this feature of the invention to practice, uprights 13 are fixed to opposite sides of the tractor at the front, as shown, and support at their upper ends a transverse shaft 14 carrying pulley wheels 15 over which are trained cables 16, the forward ends of which are fastened at the front ends of the walls 5 of the body by means of bolts 16'. The cables 16 are extended downwardly from the pulley wheels 15 and trained respectively about pulley wheels 17 and 18 mounted on shafts 19 and 20, which shafts are suitably mounted on the medial and rear portions of the tractor.

Various means may be employed for imparting movement to the cables, but in the example shown, the opposite ends of the cables are fixed to arms 21 forming parts of a conventional hydraulic power lift of the Deere tractor, said arms being operated by the foot lever 22 of the tractor so that the scoop body may be moved to and held in any of its described positions.

Normally the scoop body is in the position shown in full lines in Fig. 1 and when the tractor is moved forwardly the scoop body will become automatically loaded. When loaded the power lift is operated to move the body to a horizontal or carrying position as shown in dotted lines. Subsequently when a desired dumping point is reached by the tractor the power lift is again operated to move the scoop body to a dumping position, also shown in dotted lines, the end gates 9 having in the meantime been unlatched to permit the material to be dumped or spread from the channels 8.

It is believed that the manner of operating my scoop will be evident from the preceding description. Likewise it is believed that the advantages of the invention will be readily apparent.

While I have described what I consider to be the best embodiments of my scoop attachment, it is obvious, of course, that various modifications can be made in the specific structures shown and described without departing from the purview of this invention. My attachment can be fitted to other makes of tractors readily, provided that they are of the row crop type which have low front wheels which do not extend laterally substantially beyond the limits of the tractor hood. Various means can be employed for operating the scoop from the hydraulic power lifts of these tractors. The rear bifurcated ends of the scoop can be designed so as to dump either centrally, to the outside or directly to the rear, as in the embodiment shown in the drawing. And while I have mentioned several uses to which the attachment can be put it is evident that many additional uses will be found by intelligent operators. Other modifications of this invention which fall within the scope of the following claims will be immediately evident to those skilled in this art.

What I caim is:

1. A scoop or grading attachment for tractors of the row crop type having closely-spaced, low supporting wheels, which comprises a scooping body arranged transversely and forwardly of the front wheels of the tractor and having the medial and rear portion bifurcated and straddled about the front of the tractor frame and pivotally connected to the latter at a point in proximity to the rear end of the body so that the front end is normally tilted toward and engaged with the ground.

2. A scoop or grading attachment as claimed in claim 1 in which the scooping body is provided with a divider at the forward end of the bifurcation and with upright walls along the sides forming spaced channels at the sides of the body extending to the rear thereof and into which material is directed by the divider.

3. A scoop or grading attachment as claimed in claim 1 in which means operably connected to the power lift of the tractor are provided for raising and lowering the front end of the scoop into dumping, loading and carrying positions.

4. The combination with a tractor of the row crop type having a narrow frame at the front and closely arranged low front wheel supporting members and a power lift at the rear thereof of a scooping and carrying body arranged transversely of the front of the tractor having the medial and rear portions bifurcated and straddled about the front of the frame and the front supporting members thereof and pivotally and removably connected to the frame in such a manner that the front end of the scooping body normally engages the ground, and means for raising and lowering the body comprising brackets and pulleys mounted on the frame of the tractor and cables having their front ends fixed to the front of the scooping body and trained about the pulleys and operably connected to the power lift.

5. An arrangement as claimed in claim 4 in which the body is provided with upright walls along its sides and the sides of the bifurcation to form a divider at the front of the bifurcation and spaced channels extending along the sides to the rear and swinging end gates for closing the rear ends of the channels.

6. A tractor of the row crop type having a frame, a narrow hood and low front wheels which extend laterally not substantially beyond the confines of the hood, in combination with a scoop attachment pivoted to said frame and having a body extending in front of said hood, the rear end of said body being formed into two channels straddled around on both sides of said hood, the front end of said attachment being adapted to scoop up dirt and the like and the rear end being adapted to dump said dirt, and means for raising and lowering the front end of said attachment about said pivot to bring the attachment into loading, carrying and dumping positions.

7. The combination of claim 6 wherein means is provided for dividing the dirt scooped up and directing it into said channels during loading and dumping of the attachment.

8. The combination of claim 6 wherein said tractor is provided with a power lift and wherein said raising and lowering means includes a connection from the front end of said attachment to said power lift.

9. The combination of claim 6 wherein the rear end of said attachment is provided with swinging gates, pivoted at the top, to release the dirt during dumping of the attachment.

10. The combination of claim 6 wherein said attachment is pivoted to the frame of the tractor at a point such that the front end of the attachment tends to engage the ground.

JULIUS K. PICKENS.